No. 691,557. Patented Jan. 21, 1902.
R. E. LEVE.
HANDLE FOR MAKING AND BREAKING CIRCUITS.
(Application filed Nov. 14, 1901.)
(No Model.)
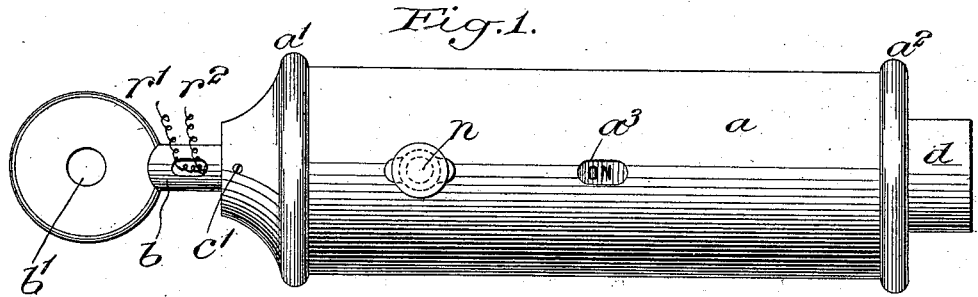
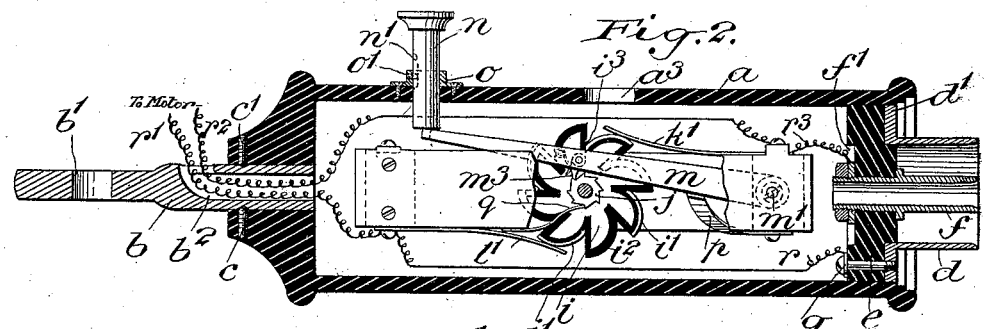
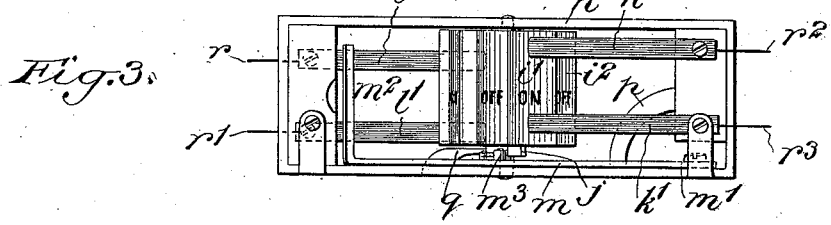
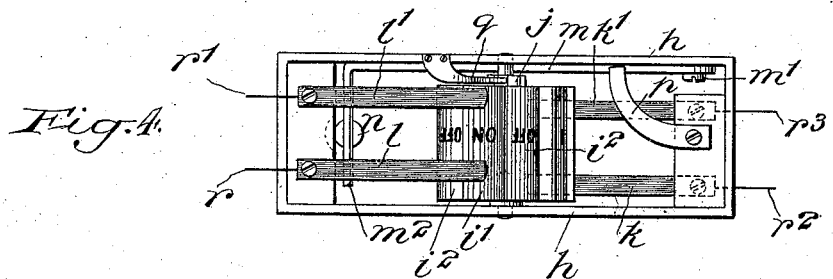

UNITED STATES PATENT OFFICE.

ROBERT E. LEVE, OF NEW YORK, N. Y.

HANDLE FOR MAKING AND BREAKING CIRCUITS.

SPECIFICATION forming part of Letters Patent No. 691,557, dated January 21, 1902.

Application filed November 14, 1901. Serial No. 82,188. (No model.)

*To all whom it may concern:*

Be it known that I, ROBERT E. LEVE, a citizen of the United States, and a resident of the borough of Manhattan, in the city and State of New York, have invented a new and useful Handle for Making and Breaking Circuits, of which the following is a specification.

My invention relates to a handle for making and breaking electric circuits, and is adapted to use in connection with tools and machines in general where it is desirable to make and break electric circuit for operating the tool at frequent intervals.

The particular use to which I have applied it is a cloth-cutting machine, where the handle serves to guide the machine along the table or support on which the goods are laid to be cut while bringing the electric circuit for actuating the motor which drives the cutter under the control of the thumb or finger of the operator while still grasping the handle. The cloth-cutter, with the handle attached thereto, as in use, is shown, described, and claimed in my pending application of even date herewith, the present application being limited to the handle structure *per se.*

In the accompanying drawings, Figure 1 is a plan view of the handle as it appears when the contact is completed and the current on. Fig. 2 is a longitudinal section. Fig. 3 is a top plan view in detail of the frame carrying the contact-pieces and contact making and breaking wheel, and Fig. 4 is a bottom plan view of the same.

The casing of the handle is denoted by $a$. It preferably consists of a hollow cylinder of some suitable non-conducting material—such, for instance, as hard rubber—having beads $a'$ $a^2$ at its opposite ends for the purpose of keeping the hand in position thereon. Its end toward the tool or machine to which it is to be attached is conveniently provided with a metallic connecting-piece $b$, having its shank set in the end of the handle and fixed in position—as, for example, by means of set-screws $c$ $c'$. The opposite end of the connecting-piece may be provided with a perforation $b'$ for attaching the handle to the part to be manipulated by it, and that portion of the shank which is embedded in the end of the handle is provided with a passage-way $b^2$, leading from its inner end along within the shank and thence through the wall of the shank at a point exterior to the end of the handle for the purpose of forming a conduit for extending electric conducting-wires from the interior of the handle-casing to the exterior thereof. The opposite end of the handle is also provided with a tubular connecting-piece $d$, having a laterally-turned flange $d'$ at its inner end and faced with a block of some suitable insulating material $e$, fixed to its face and fitted to the interior of the casing $a$.

The tubular connecting-piece $d$, with its facing $e$, is intended to form a closure for the outer end of the handle-casing $a$, and centrally within the tubular portion $d$ is located a smaller tube $f$, which extends through the facing-piece $e$ to the interior space within the casing $a$, where it is provided with a contact-piece $f'$.

The central tube $f$ is insulated, as shown, from the larger tube $d$, and the latter has an electric connection located within the casing $a$ by means of a binding-post $g$, which extends through the facing-piece $e$ to the flange $d'$ of the tubular piece $d$.

Within the casing $a$ there is located a frame $h$, preferably of oblong rectangular form, as shown, and of sufficient width to slide within the casing with a free sliding fit and of such depth as to leave a free space above and below it, as clearly shown in Fig. 2.

Between the sides of the frame $h$ and about centrally of the frame there is journaled a circuit make and break wheel $i$, having fixed to rotate therewith a ratchet-toothed pinion $j$.

The wheel $i$ has its periphery provided with metallic conducting-plates $i'$, alternating with non-conducting material $i^2$, the conducting and non-conducting parts extending longitudinally along the periphery of the wheel from end to end and separated from each other by means of longitudinal depressions $i^3$.

The structure is such as to give the periphery of the wheel $i$ the appearance of a series of ratchet-like teeth, having their backs curved in the transverse plane of the wheel and their faces abrupt.

A set of resilient contact arms or pieces $k$ $k'$ are fixed at one end to the frame $h$, near one end of the frame, in the present instance the outer end, and suitably insulated from one another, with their free ends resting on the periphery of the wheel $i$, in the present instance on top of the wheel. Another set of resilient contact arms or pieces $l\ l'$ are fixed at one end to the frame $h$, at or near its forward end, and suitably insulated from each other, with their free ends resting on the periphery of the wheel $i$, in the present instance on the under side of the wheel.

The several peripheral divisions or sections of the wheel $i$ are marked to indicate to the eye through a peep-hole $a^3$ in the casing whether the current is turned on or off. This is done by placing the word "On" on each of the metallic plates $i'$ in position to come opposite the peep-hole $a^3$ in the casing and the word "Off" on each of the non-conducting plates $i^2$, also in position to come opposite the peep-hole $a^3$ as the wheel is turned.

The wheel $i$ is operated by means of a lever $m$, pivotally secured to the frame, as at $m'$, and extending thence along the side of the casing, as clearly shown in Fig. 3, over the ratchet-toothed pinion $j$ to the opposite end of the frame, and then turning at right angles across the space between the sides of the frame, as shown at $m^2$, Fig. 3, to a point beneath the plunger $n$, which works up and down within a suitable bearing $o$, fixed to the top of the handle, its vertical movement being conveniently limited by means of a feather $o'$, working in a groove $n'$ in the side of the plunger. The lever $m$ is held at the limit of its upward movement by means of a spring $p$, fixed at one end to the frame $h$ and having its free end engaged with the under side of the lever, and a spring-actuated dog or pawl $m^3$, carried by the lever $m$, has its free end in engagement with the ratchet-toothed pinion $j$ in such position that when the lever $m$ is depressed it will rotate the wheel $i$ a distance to slide the contact-pieces from one of the conducting-plates $i'$ to the non-conducting plate $i^2$, or vice versa.

The wheel $i$ is prevented from a retrograde movement by means of a resilient retaining-pawl $q$, fixed to the frame $h$ and having its free end engaged with the ratchet-toothed pinion $j$.

The electric connection is as follows: Assuming one of the feed-wires to be in connection with the tubular part $d$ at the outer end of the handle, electric connection is made through the binding-post $g$ to the wire $r$, thence to the contact-piece $l$, thence through the contact-plate $i'$ on the wheel $i$ to the contact-piece $l'$, thence by wire $r'$ to motor, thence returning from motor by wire $r^2$ to contact-piece $k$, thence through conducting-plate $i'$ on the wheel $i$ to contact-piece $k$, thence by wire $r^3$ to the contact-piece $f'$, and thence to the tubular connecting-piece $f$, with which the opposite feed-wire is assumed to be connected.

In use while the hand is still grasping the handle-casing $a$ the thumb or finger by depressing the plunger $n$ may rock the wheel $i$ one step at each depression, thereby throwing the contact-pieces, both sets of them, either from the conducting-plates $i'$ onto the non-conducting plates $i^2$ or from the non-conducting plates $i^2$ onto the conducting-plates $i'$ at pleasure, thereby positively making and breaking the circuit and maintaining the circuit either made or broken against any possible mistake. This arrangement, it will be noted, relieves the hand of the operator from pressing on the plunger except just for the moment necessary to make or break the circuit. The circuit having once been made and the motor started, the thumb and all of the fingers of the operator's hand are free to grasp the handle and guide the machine with precision.

The structure is one which is subject to very little wear. The contacts are rubbing contacts. The movable parts are so housed that they are well protected from dust or foreign matter, which would be liable to interfere with their action.

It is obvious that changes might be resorted to in the form, construction, and arrangement of the several parts without departing from the spirit and scope of my invention. Hence I do not wish to limit myself strictly to the structure herein set forth; but

What I claim is—

1. A handle for making and breaking contact comprising a casing for receiving the grasp of the hand, a rotary wheel mounted within the casing and having its periphery separated alternately into conducting and non-conducting sections, sets of contact-pieces located in position to simultaneously engage either the conducting-sections or non-conducting sections on the wheel, means for connecting the motor and feed-wires with the contact-pieces and means under the control of the hand while grasping the handle for moving the said wheel step by step, substantially as set forth.

2. A handle for making and breaking electric circuits comprising a suitable casing for receiving the grasp of the hand, a rotary wheel mounted within the casing and having its periphery separated into alternate conducting and non-conducting sections, sets of contact-pieces arranged to simultaneously engage either conducting-sections or non-conducting sections, a ratchet-pinion mounted to rotate with the wheel, a spring-actuated lever mounted within the casing, a pawl carried by the lever in position to engage the ratchet-wheel and a plunger extending through the wall of the handle-casing into engagement with said lever, the said plunger being under the control of the hand of the operator while grasping the handle, substantially as set forth.

3. A handle for making and breaking electric circuits, comprising a suitable casing for receiving the grasp of the operator's hand and provided with a peep-hole therethrough, a rotary wheel mounted within the casing and having its periphery separated into conducting and non-conducting sections, the said sections being provided with symbols arranged to come opposite the peep-hole in the casing to indicate current on and off, sets of contact-pieces engaged with the periphery of said wheel, a plunger mounted in the wall of said casing and means under the control of the plunger for operating the said wheel to make and break the circuit, at pleasure, substantially as set forth.

4. A handle for making and breaking electric circuits, comprising a suitable casing for receiving the grasp of the hand of the operator, a supporting-frame independent of said casing and adapted to be inserted in and removed from the casing, a circuit making and breaking wheel mounted in said frame, a lever for operating said wheel mounted in said frame, contact-pieces secured to said frame and engaged with the said wheel and a plunger mounted in the handle-casing in position to engage the lever for operating the said wheel, substantially as set forth.

In testimony that I claim the foregoing as my invention I have signed my name, in presence of two witnesses, this 1st day of November, 1901.

ROBERT E. LEVE.

Witnesses:
FREDK. HAYNES,
HENRY THIEME.